May 28, 1963   A. B. BUTTERWORTH   3,091,423
HOOK AND PEG HOLDING MEANS FOR BOARDS AND WALLS
Filed Nov. 6, 1961   2 Sheets-Sheet 1
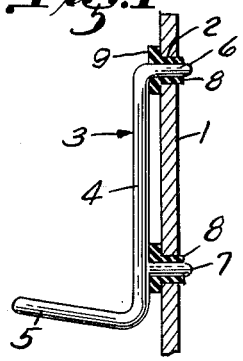
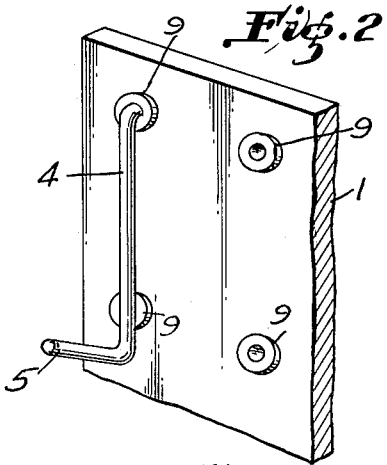
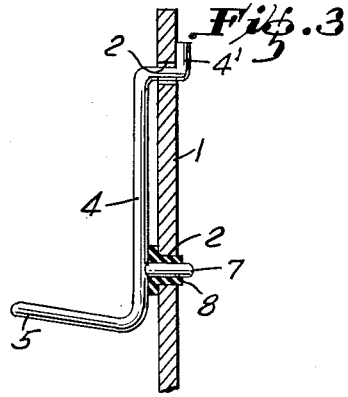
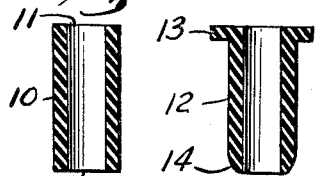
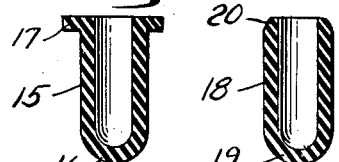
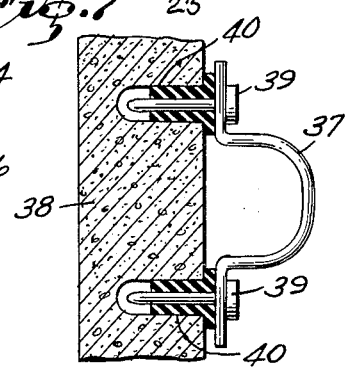
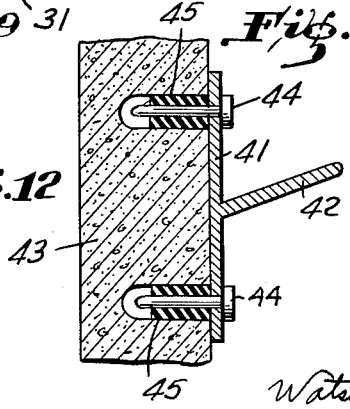
INVENTOR
ARTHUR B. BUTTERWORTH
BY
Watson Cole Grindle & Watson
ATTORNEYS

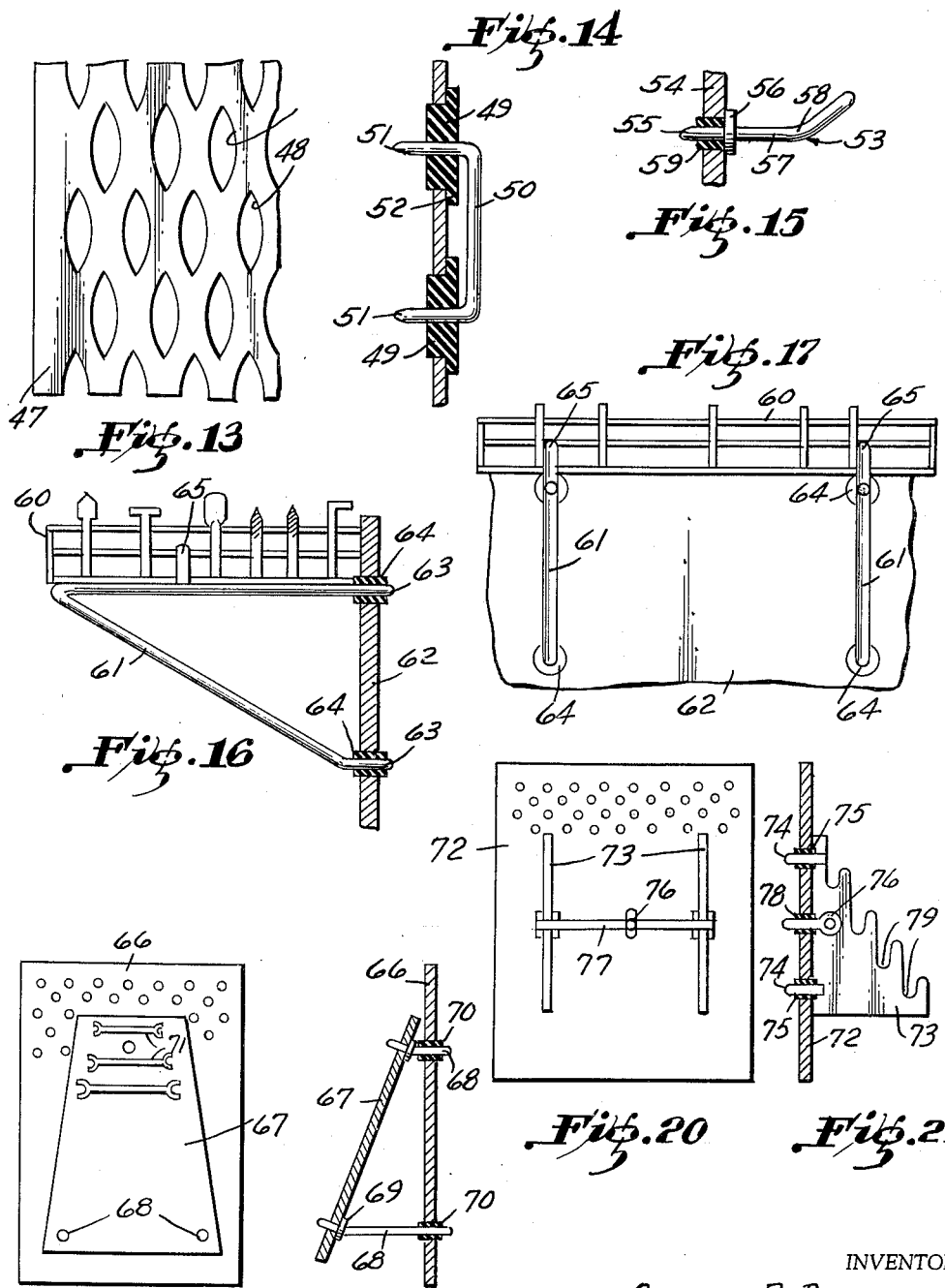

United States Patent Office 3,091,423
Patented May 28, 1963

3,091,423
HOOK AND PEG HOLDING MEANS FOR BOARDS AND WALLS
Arthur B. Butterworth, Ashbrook-on-the-James, Rte. 2, Smithfield, Va.
Filed Nov. 6, 1961, Ser. No. 150,554
1 Claim. (Cl. 248—225)

This invention relates to mounting means for hooks and pegs in apertured boards and brick and masonry walls and particularly bushings of compressible and pliable material.

It is an object of this invention to provide a bushing to fit around a metal shank of a peg or hook member and such bushing to fit resiliently a perforation in an apertured peg board or brick and masonry walls. It is a further object of the invention to provide resilient bushings for each pin of a hook member to accommodate slight disalignment as to such pins and apertures in which the pins fit. Another object of the invention resides in the provision of an elastic bushing to prevent the hook member to shift in its mounting and thus prevent wobbling of the hook member and the element it supports.

A still further object of the invention is to provide mounting means for various types of hooks to be secured in brick and masonry walls as well as apertured walls. Another object of the invention resides in a perforated board having openings which cooperate with bushing members to secure hook or peg elements thereto. It is also possible to mount various bracket elements on the board held thereon by means of the securing means set in resilient bushing members. All types of support and display elements can be secured on the board.

A further object of the invention is to provide a wall or plate with perforations which are larger than the pegs or pins to be inserted therein and means in the form of elastic and resilient gripping elements are held in a secure position in the perforations and around the pegs to thus hold support means in a rigid state of suspension.

Further objects will be apparent from the following description when considered in connection with the accompanying drawings in which:

FIGURE 1 is a side view partly in section of a hook mounted in a portion of an apertured board, FIGURE 2 is a perspective view of the board of FIGURE 1, FIGURE 3 is a side view of a modified hook, FIGURES 4 to 8 are longitudinal sections of five different types of bushings, FIGURE 9 is a sectional view of a masonry wall showing a hook member mounted therein, FIGURE 10 is a sectional view of a masonry wall showing modified mounting and hook constructions, FIGURE 11 is a sectional view of a masonry wall showing another modified mounting and hook construction, FIGURE 12 is a sectional view of a masonry wall showing a further modified mounting and hook construction, FIGURE 13 is a plan view of a modified apertured board, FIGURE 14 is a sectional view of a mounting means for a U-shaped hook member, FIGURE 15 is a sectional view of a modified peg and mounting structure in an apertured board, FIGURE 16 is a side elevation of a shelf support mounted on a "peg-board,"

FIGURE 17 is a front elevation of the shelf and support of FIGURE 16,

FIGURE 18 is a front elevation of a tool support on a "peg-board,"

FIGURE 19 is a sectional view of the tool support and "peg-board" of FIGURE 18,

FIGURE 20 is a vertical elevation of a support and "peg-board" showing a modified structure, and FIGURE 21 is a sectional view of the support and "peg-board" of FIGURE 20.

Referring now to FIGS. 1 to 3, the board 1 may be made of any suitable material such as wood, plywood, metal, any plastic substance, cardboard, etc. and any number and arrangement of perforations 2 may be provided in the board 1. A hook member 3 may take the form as shown in FIG. 1 in which a shank section 4 has a hook 5 at one end and a right angle securing pin 6 at the other end. Near the hook 5 there is provided a pin 7 which is mounted on the shank section 4 at approximately right angles thereto. Each hole 2 is provided with a bushing 8 of a resilient material such as rubber, plastic or any other suitable substance. Each bushing 8 has a flat collar section 9 and as shown in FIGS. 1 and 2 each pin 6 and 7 is pushed with some resistance into its bushing so that the bushings grip the pins. Thus the hooks are inserted in pliable bushings which will prevent side play of the hooks and presents a more positive holding than if the metal pins are fastened directly in the perforations. If there is a slight misalignment the resilient bushings will take up this difference and securely hold the hook on the board. The shanks as well as the pins may be slightly tapered and the pins are also slightly pointed. In FIG. 3 the hook 4 is similar to the hook in FIGS. 1 and 2 except that an angle bend 4' is provided at the upper end.

The bushings are made of rubber or plastic material or of other suitable compressible material and FIG. 4 shows a bushing 10 having open ends 11. In FIG. 5, the bushing 12 has one end provided with an annular flange 13 and the other end 14 is slightly chamfered. In FIG. 6 the bushing 15 has a closed end 16 with a flange 17 at the other end. In FIG. 7 the bushing 18 has one end 19 closed and the other end is chamfered at 20. In FIG. 8 the bushing 21 has an open end 22 which is chamfered and the other end 23 is also open and has an upset projection 24. All the bushings of FIGS. 4 to 8 are made of a resilient material such as rubber, plastic substances, etc.

FIG. 9 shows a wall 25 of masonry such as concrete with holes 26 therein each to receive a bushing 27 having an annular flange 28. The hook 29 is secured on a U-shaped mount 30 having two pins 31 each of which extends into its respective bushing 27 and having a pointed end 32.

FIGURE 10 shows a masonry wall 33 illustrating one peg 34 insertion with a plastic sleeve 35 molded on the peg with a closed round end. This permits the hook shank 36 to be suspended flush with the wall 33.

FIG. 11 specifically illustrates a pipe clamp 37 mounted on a masonry or brick wall 38 with nails 39 penetrating into and through the rubber or plastic bushings 40.

FIGURE 12 is a wall mounting for a flat metal strip 41 having a projecting member 42. The strip is secured in the masonry wall 43 by means of nails 44 projecting through bushings 45 of rubber or plastic. This projecting member or peg 42 may be used to support any article or articles which may be placed on the peg or suspended therefrom.

FIGURE 13 is an expanded metal sheet 47 having a plurality of elongated openings 48 therein to receive bushing elements 49 as shown in FIG. 14. The latter figure shows a U-shaped fitting 50 with the two projecting pins 51 each held in its bushing 49 which is preferably flanged at 52. The openings 48 may be lens or diamond shaped or they may have any other suitable configuration. When the fitting 50 is pressed into the bushings 49, the latter will expand due to the penetration of the pins 51 to thus lock the fitting tightly in place. Also the openings 48 may be square, triangular or rectangular in shape and the rubber or plastic inserts conform to the shape of the holes.

It is also possible to mount a hook 53 in the sheet or plate material 54 as shown in FIG. 15 and each hook 53 has a nail portion 55 with its flange 56 and the shank portion 57 bent at 58 upwardly to support various articles. The portion 55 penetrates through and is held in the plate 54 by means of a rubber or plastic bushing 59.

In order to support a shelf 60 which may be removable a plurality of brackets 61, FIGS. 16 and 17 may be supported on a vertical wall or plate 62 and each bracket 61 has a pair of pins 63 which may be pressed into and through the bushings 64. Such a shelf 60 may receive and hold small articles and each bracket 61 has an upwardly projecting pin 65 to aid in supporting the shelf and the articles, such as tools, therein.

FIG. 18 shows a peg board 66 which is adapted to receive and support a tool rack 67 which latter may be supported by a plurality of pins 68 each having a small flange 69 and pushed into or inserted through the bushings 70 of rubber or plastic, FIG. 19. The rack 67 shows as an example a plurality of wrenches 71 supported on the rack 67.

FIGS. 20 and 21 show a peg board 72 on which a plurality of bracket supports 73 are mounted by means of pegs 74 at the upper and lower parts and these pegs 74 pass through and are held on the board 72 by means of rubber or plastic bushings 75. A central pin or peg 76 is secured on a support rod 77 which latter passes through the supports 73 and this peg 76 is also held on the board by means of a bushing 78 as shown in FIG. 21. The board 72 may be wood, plastic, metal or any suitable material may be used. Also the supports 73 may have a plurality of indentations 79 which may receive tools, pipes, bars, drills and the like.

It will be evident from the foregoing that the supports shown and described are capable of holding a great many different articles irrespective of size and even weight. The use of rubber or plastic bushings to surround the pegs or pins elastically grip and hold the pins without any difficulty.

The fittings such as 3, 4, 36, 37, 41, etc. may be made of any metal, metal alloy or plastic material.

I claim as my invention:

A board having a plurality of holes therein to receive article supporting means by means of pegs on the support means, and a resilient bushing in each hole having a central passage therethrough at least as long as the depth of the hole in the board to grip and hold the peg, said bushing being compressed throughout its length against its hole in the board when it receives its peg and against the peg throughout the length of the bushing.

References Cited in the file of this patent

UNITED STATES PATENTS

| | | |
|---|---|---|
| 2,088,358 | Adams | July 27, 1937 |
| 2,614,701 | Mapson | Oct. 21, 1952 |
| 2,766,958 | Levy | Oct. 16, 1956 |
| 2,785,453 | Wentz | Mar. 19, 1957 |
| 2,790,616 | Cardinal | Apr. 30, 1957 |
| 2,872,145 | Goldsholl | Feb. 3, 1959 |
| 2,954,125 | Husted | Sept. 27, 1960 |
| 2,980,381 | Dectrow | Apr. 18, 1961 |

FOREIGN PATENTS

| | | |
|---|---|---|
| 865,823 | Great Britain | Apr. 19, 1961 |
| 1,119,347 | France | Apr. 3, 1956 |